June 17, 1941.  J. H. STAAK  2,246,270
DYNAMOELECTRIC MACHINE
Filed July 10, 1940
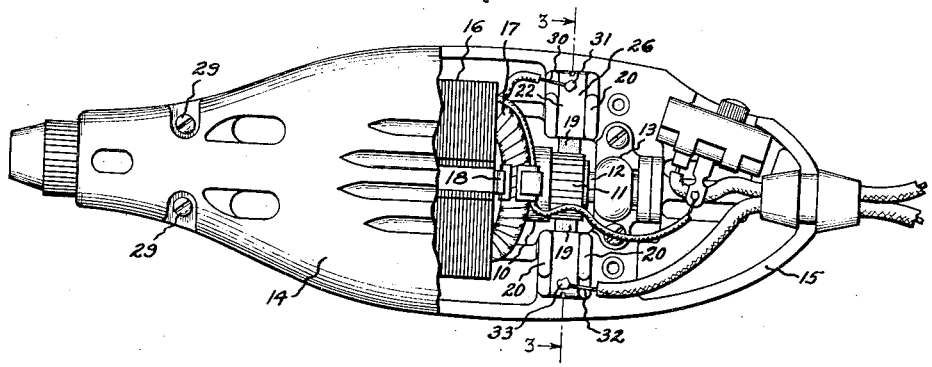
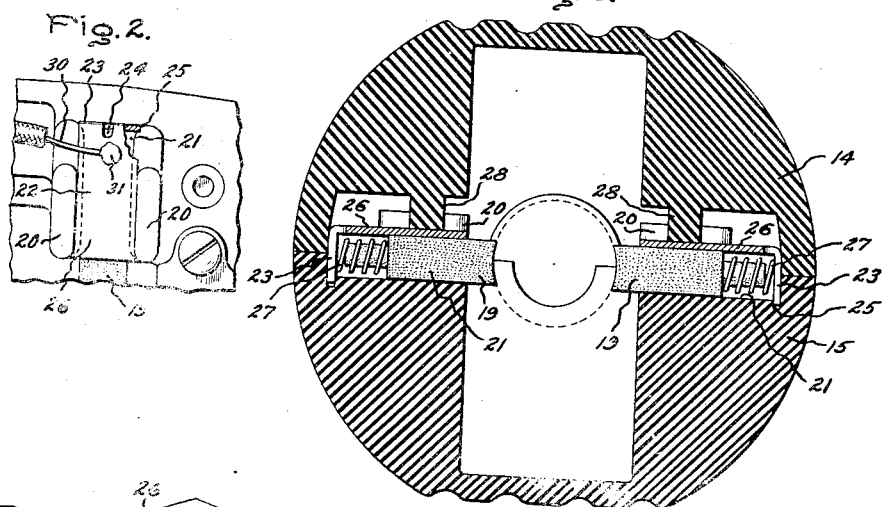
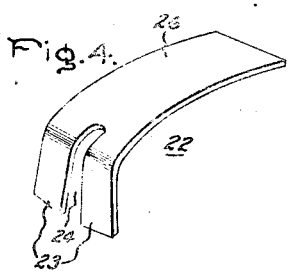
Inventor:
Julius H. Staak,
by Harry E. Dunham
His Attorney.

Patented June 17, 1941

2,246,270

UNITED STATES PATENT OFFICE 2,246,270

DYNAMOELECTRIC MACHINE

Julius H. Staak, Fort Wayne, Ind., assignor to General Electric Company, a corporation of New York Application July 10, 1940, Serial No. 344,723

9 Claims. (Cl. 171—324)

My invention relates to dynamo-electric machines, and more particularly to an improved casing and brush rigging for such machines.

An object of my invention is to provide an improved dynamo-electric machine construction using a simplified brush rigging and supporting casing.

Another object of my invention is to provide an improved and simplified brush rigging for a dynamo-electric machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a plan view, partly broken away, showing a dynamo-electric machine provided with my improved brush rigging and casing construction; Fig. 2 is a partial enlarged view of the brush rigging shown in Fig. 1; Fig. 3 is a sectional view taken along lines 3—3 of Fig. 1; and Fig. 4 is a perspective view of an L-shaped contact clip forming a part of my brush rigging.

Referring to the drawing, I have illustrated a dynamo-electric machine having a rotatable member 10 provided with a commutator 11 and mounted on a shaft 12 which is supported in similar spherical bearings 13 at each end thereof. These bearings are mounted in a longitudinally divided supporting casing comprising two complementary parts 14 and 15 formed of any suitable insulating material, such as a phenolic condensation product. The stationary member of the dynamo-electric machine is provided with a laminated core 16 which is adapted to be excited by field exciting windings 17 secured to the stationary member by retaining clips 18. The rotatable member commutator 11 is adapted to be supplied with electric current by brushes 19 supported in a brush rigging including a brush holder formed in the part 15 of the insulating casing. Three sides of the brush holder are formed of the insulating material of the casing 15 for guiding the brush toward the commutator with two of these sides 20 spaced apart and extending upwardly from the casing and the third side 21 forming the bottom of the brush holder. An L-shaped retaining clip 22 of electrically conductive material having arms extending in different directions, as shown in Fig. 4, is arranged to form the fourth side of the brush holder. The shorter arm of the L-shaped clip is bifurcated and includes two sections 23 which are separated by a slot 24 and are spread apart and inserted in a slot 25 formed in the insulating casing 15 slightly wider than the spacing between the sides 20 and adjacent the outer end of the brush holder for retaining the clip in position with the long arm 26 thereof in contact with the upper side of the brush for retaining the brush in position in the brush holder. A coil spring 27 is arranged between the shorter arm 23 of the spring clip and the adjacent end of the brush 19 for biasing the brush into contact with the commutator. The longer arm 26 of the L-shaped clip is bowed outwardly adjacent the center thereof, as shown in Fig. 4, and a boss or lug 28 is formed in the upper part 14 of the insulating casing and adapted to engage the longer arm 26 so as to bias it into contact with the adjacent side of the brush 19 when the two parts 14 and 15 of the casing are secured together by bolts 29. The electrical connection to the brush is made through the retaining clip 22 to which a lead 30 from the field winding is secured by soldering, as at 31, and a lead 32 connected to a source of electrical power supply is connected to the other clip by soldering, as at 33. Thus, the brushes may be simple carbon blocks without any external lead connections, and the contact element for the brush holder includes only the simple clip 22.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A brush rigging for a dynamo-electric machine having a casing including a brush holder of insulating material formed as a part of said casing, and means including a clip of conductive material having a relatively longer arm and a relatively shorter arm extending in different directions for retaining a brush in said brush holder, the shorter arm of said clip being secured to said casing for retaining said clip in position with the longer arm thereof forming a side for said brush holder.

2. A brush rigging for a dynamo-electric machine having a casing including a brush holder of insulating material having spaced apart sides formed as a part of said casing, a slot formed in said casing adjacent the outer end of said brush holder and slightly wider than the spacing between said brush holder sides, and means including an L-shaped clip of conductive material for retaining a brush in said brush holder, the shorter arm of said L-shaped clip being inserted in said slot for retaining said clip in position with the longer arm thereof forming a side for said brush holder.

3. A brush rigging for a dynamo-electric machine having a casing including a brush holder of insulating material having spaced apart sides formed as a part of said casing, a slot formed in said casing adjacent the outer end of said brush holder and slightly wider than the spacing between said brush holder sides, means including an L-shaped clip of conductive material for retaining a brush in said brush holder, the short arm of said L-shaped clip being bifurcated and spread apart wider than said slot and being inserted into said slot for retaining said clip in position with the longer arm thereof forming a side for said brush holder, and a lead connected to said retaining clip.

4. A brush rigging for a dynamo-electric machine having a casing including a brush holder of insulating material formed as a part of said casing, a slot formed in said casing adjacent the outer end of said brush holder and slightly wider than said brush holder, means including a clip of conductive material having arms extending in different directions for retaining a brush in said brush holder, one of said arms of said clip being inserted into said slot for retaining said clip in position with another of said arms forming a side for said brush holder, a lead connected to said retaining clip, and means including a boss of insulating material formed on said casing for biasing said clip toward said brush holder.

5. In combination, a dynamo-electric machine having a stationary member and a rotatable member provided with a commutator, a longitudinal divided supporting casing formed of two complementary half sections, a brush rigging for said rotatable member commutator including a brush holder of insulating material formed in one section of said supporting casing and including three sides for guiding a brush, a brush in said brush holder, an L-shaped retaining clip of conductive material, the shorter arm of said L-shaped clip being secured to said casing for retaining said clip in position with the long arm thereof in contact with said brush, and means including a spring arranged between said shorter arm of said clip and the adjacent end of said brush for biasing said brush into contact with said commutator.

6. In combination, a dynamo-electric machine having a stationary member and a rotatable member, a supporting casing, a brush rigging for said rotatable member including a brush holder of insulating material formed in said supporting casing and including a bottom and two sides for guiding a commutator brush, a slot formed in said frame adjacent the outer end of said brush holder slightly wider than said brush holder, means including an L-shaped clip of conductive material for retaining a brush in said brush holder, the short arm of said L-shaped clip being inserted into said slot for retaining said clip in position with the longer arm thereof forming a side of said brush holder, a lead connected to said retaining clip, and a boss of insulating material formed on said supporting casing for biasing said clip towards said brush holder.

7. In combination, a dynamo-electric machine having a stationary member and a rotatable member provided with a commutator, a longitudinal divided supporting casing formed of two complementary half sections, a brush rigging for said rotatable member commutator including a brush holder of insulating material formed in one section of said supporting casing and including three sides for guiding a brush, a brush in said brush holder, a retaining clip of conductive material having arms extending in different directions, one of said arms of said clip being secured to said casing for retaining said clip in position with another of said arms in contact with said brush, and means including a boss of insulating material formed on the other of said sections of said supporting casing and arranged in engagement with said clip for biasing said clip towards said brush.

8. In combination, a dynamo-electric machine having a stationary member and a rotatable member provided with a commutator, a supporting casing formed of two complementary half sections, a brush rigging for said rotatable member commutator including a brush holder of insulating material formed in one section of said supporting casing and including three sides for guiding a brush, a slot formed adjacent the end of said brush holder away from said commutator and formed slightly wider than the space between the sides of said brush holder, a brush in said brush holder, an L-shaped retaining clip of conductive material, the short arm of said L-shaped clip being bifurcated and spread apart slightly wider than said slot and being inserted into said slot for retaining said clip in position with the long arm thereof in contact with said brush, means including a spring arranged between said short arm of said clip and the adjacent end of said brush for biasing said brush into contact with said commutator, a lead connected to said retaining clip, and means including a boss of insulating material formed on the other section of said supporting casing for biasing said clip towards said brush holder.

9. A contact element for a brush holder including an L-shaped clip of conductive material the shorter arm of which is bifurcated and spread apart at its outer end for engagement with said brush holder, the longer arm of said L-shaped clip extending outwardly adjacent the center thereof, and an electrically conductive lead connected to the outer side of said longer arm.

JULIUS H. STAAK.